Feb. 13, 1934.   W. S. PRITCHARD   1,946,546
MEASURING VALVE
Filed Jan. 11, 1926
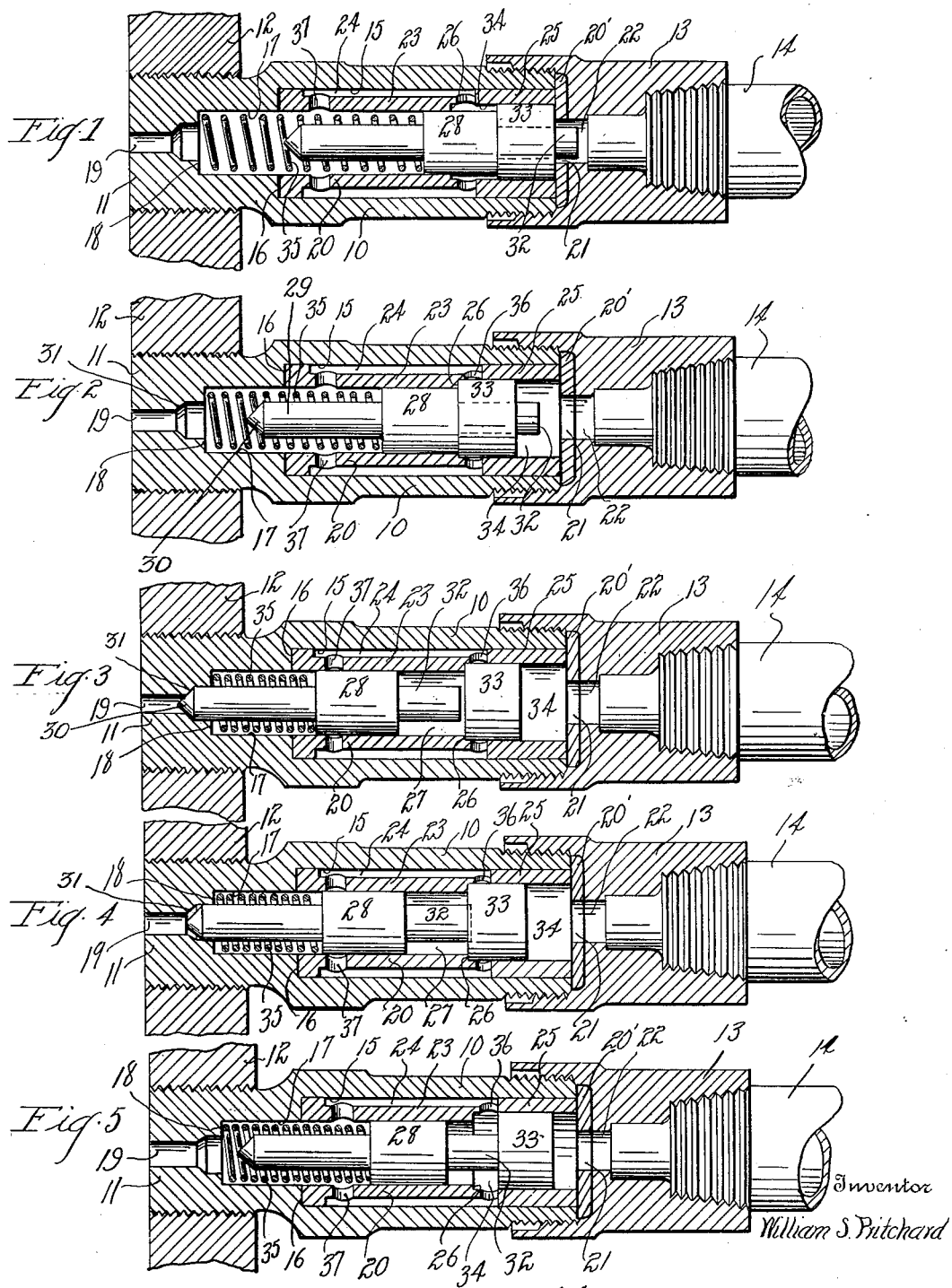
Inventor
William S. Pritchard Patented Feb. 13, 1934

1,946,546

UNITED STATES PATENT OFFICE 1,946,546

MEASURING VALVE

William S. Pritchard, Detroit, Mich., assignor to Motor Products Corporation, Detroit, Mich., a corporation of New York Application January 11, 1926. Serial No. 80,686

13 Claims. (Cl. 184—7)

This invention relates to measuring valves more particularly designed for use in connection with lubricating systems where the lubricant is supplied under pressure practically simultaneously to a plurality of points to be lubricated.

While the invention is applicable with equal facility to lubricating systems for use in connection with various types of apparatus the invention has particular reference to a measuring valve for use in connection with motor vehicle lubricating systems known as the "one shot" systems. Such systems include a plurality of conduits leading from a source of lubricant supply to the several bearings or other parts of the vehicle to be lubricated. In order to cheapen and simplify the system of conduits it has been the practice to connect a plurality of the bearings or other points of distribution in series in such a manner that the most remote bearing is first supplied with lubricant until the same is filled whereupon the nearer bearings are successively supplied as the preceding ones are filled to capacity.

In order for such a system to function efficiently for continued use it is necessary that measuring valves or the like be associated with each bearing so that only a predetermined amount of lubricant is supplied each bearing at each lubricating operation whereupon the lubricant supplied is checked at that bearing so as to accumulate pressure in the conduit to successively force lubricant to the other bearings connected to the conduit.

The invention has among its primary objects to provide a measuring valve capable of use in connection with lubricating systems such as those referred to hereinbefore wherein predetermined amounts of lubricant may be supplied to the bearings or other points of distribution whereupon the valves will function to close communication between the source of supply and the bearing.

Another object of the invention is to provide a valve of this character wherein the quantity of lubricant fed to the bearing may be varied as desired.

The invention has also among its objects to simplify, render more efficient and improve generally devices of this character and the above as well as other objects, advantages and novel details of construction of this invention will be made more apparent as this description proceeds, especially when considered in connection with the accompanying drawing, wherein, Fig. 1 is a longitudinal sectional view of a measuring valve constructed in accordance with this invention.

Fig. 2 is a similar view showing the valve parts in the first advanced position.

Fig. 3 is a similar view showing the parts in the second advanced position with the expelling piston in its extreme advanced position.

Fig. 4 is a similar view showing the parts in the position they assume immediately after commencement of the return movement thereof, and Fig. 5 is a similar view showing the parts in the position they assume just prior to their return to their original position.

Referring now particularly to the drawing wherein like reference characters indicate like parts, it will be noted that there is illustrated a valve comprising a sleeve like body 10 provided with a threaded end 11 for engagement with a bearing or like point of distribution 12. The valve is also shown as including the sleeve like extension 13 threadedly connected to the body 10 and internally threaded to receive the threaded end of a lubricant supply conduit 14.

The body 10 is formed with a longitudinal extending centrally arranged chamber 15 circumferentially shouldered as indicated at 16 to provide a relatively reduced section 17 and also circumferentially shouldered as at 18 to provide a relatively restricted discharge port 19. A sleeve 20 is arranged in the chamber 15 and rests on the one end against the shoulder 16, the other end of the sleeve being coincident with the end of the body 10 and being engaged preferably by means of a washer 20' interposed between the valve body 10 and the sleeve like extension 13 and held in place by he latter. The disc like washer 20' is provided with an aperture 21 which coincides with the bore 22 of sleeve 13 whereby communication is established between the interior of the valve body 10 and the lubricant supply conduit 14.

The sleeve 20 is provided with a portion 23 the interior diameter of which coincides with the diameter of that section of the valve body indicated by the reference character 17, the outer diameter of this section of the sleeve being less than the inside diameter of the adjacent portion of the valve body so as to provide a longitudinally extending circumferential chamber 24 between the sleeve and valve body. The end of the sleeve 23 indicated by the reference character 25 is of a greater diameter and is adapted to fit snugly within the adjacent section of the valve body 10. The sleeve 23 is further formed with an interiorly arranged circumferential shoulder 26 forming a stop for one of the valve parts yet to be described.

The sleeve 23 forms with that portion of the wall of the body 10 which is coincident therewith a chamber 27 in which a lubricant expelling piston 28 is adapted to reciprocate. This piston is provided with a forwardly projecting extension 29 formed with a valve surface 30 adapted in the position of the parts illustrated in Fig. 3 to seat upon a valve surface 31 to thus close communication between the chamber 27 and the bearing to be lubricated. The piston 28 is also formed with a rearwardly projecting extension or pin 32 which has a slidable engagement with a piston part 33. The piston 33 reciprocates in the chamber 34 formed by the portion 25 of the sleeve 23 and in one of its positions is adapted to abut the washer 20' as shown in Fig. 1 and in its other extreme position to seat upon the circumferential shoulder 26, see for instance Figures 2, 3 and 4.

The pistons 28 and 33 constituting the movable valve parts are normally held in the position illustrated in Fig. 1 by means of a spring 35 which surrounds the extension 29 and bears on the one end against the shoulder 18 and on the other against the piston 28. Communication is established between chambers 24 and 34 by means of one or more ports or apertures 36 formed in the sleeve 23 and communication is established between chamber 24 and chamber 27 by means of a plurality of ports or apertures 37 formed in the sleeve. It will be readily apparent that the piston 33 which slides in chamber 34 will in one of its positions close the apertures 36 while piston 28 in one of its positions will close apertures 37. Piston 33 together with pin 32, in the position of the parts shown in Fig. 1, interrupts communication between the interior of the valve and the supply conduit 14.

The operation of the device will now be described:

With the parts in the position illustrated in Fig. 1 lubricant under pressure is supplied through conduit 14 and acts upon the end of pin 32 and upon the exposed face of piston 33 to move these parts, against the action of spring 35, to the position illustrated in Fig. 2, in which position piston 33 has seated itself upon the circumferential shoulder 26. In this position of the parts it should also be noted that piston 33 has closed ports 36 so as to confine the lubricant contained in the chambers 24 and 27 to prevent the passage of this lubricant rearwardly past the piston 33.

It will be understood that chambers 24 and 27 are practically filled with lubricant from the preceding operation, lubricant being supplied thereto in a manner to be more fully hereinafter described.

During the continuance of the pressure of the lubricant in chamber 34 behind piston 33 and the end of pin 32 this pressure acts upon the end of pin 32 to effect a further movement of piston 28, it being obvious that piston 33 remains stationary being seated against the shoulder 26. The continued movement of piston 28 expels the lubricant contained in chamber 27 outwardly through bore 19 into the bearing to be lubricated, the feeding of the lubricant continuing until the valve portion 30 of extension 29 seats upon the valve surface 31. Practically simultaneously with the seating of these valve portions the apertures 37 are closed by the piston 28.

This position of the parts is illustrated in Fig. 3 and at this time the pin extension 32 has been moved out of engagement with the piston 33 so as to open communication through the piston 33 between chambers 34 and 27. Therefore, lubricant is supplied to the space between pistons 28 and 33, this portion of chamber 27 constituting the measuring chamber.

When pressure upon the lubricant supply has been relieved sufficiently to permit the spring 35 to predominate, piston 28 will commence its return movement. This position of the parts is illustrated in Fig. 4. The piston 28 will move until the pin 32 enters into the bore of piston 33 whereupon escape of the lubricant confined between the pistons is prevented and the pistons will move as a unit toward the right under the influence of spring 35. This movement will continue until piston 33 passes apertures 36 and thereafter the continued movement of piston 28 will expel the lubricant confined between the pistons through the apertures 36 into chamber 24 and then through ports 37 into chamber 27 to the left of the piston 28. It is apparent that this is possible because ports 36 have been uncovered by piston 33. Piston 28 moves under the action of spring 35 until it together with piston 33 again assume their original position illustrated in Fig. 1. In this position the inlet is checked by piston 33 and ports 36 are closed by piston 28.

From the foregoing it will be readily apparent that only measured quantities of lubricant can be conducted from the source of supply to the bearing irrespective of the length of time the lubricant supplied to the valve is under pressure. The sequence of operations are such that the pressure of the lubricant supplied first operates the valve parts to expel a quantity of lubricant into the bearing and to thereafter measurably receive a new supply. The return movement of the valve parts thereafter force this previously measured supply through the by-pass formed by the chamber 24 into the chamber 27 where it is in position to be forced into the bearing on the next lubricating operation. Obviously the amount of lubricant fed to the bearing may be controlled by the length of piston 33 so that the valve capacity is variable by placing washers on pin 32 to decrease the capacity of the measuring chamber or by substituting a member having a shorter piston 28 and longer pin 32 to increase the measuring chamber capacity.

While one mechanical embodiment of the invention has been illustrated herein somewhat in detail it will be readily apparent to those skilled in this art that various changes and modifications may be resorted to without departing from the spirit and scope of this invention and to this end reservation is made to make such changes as may come within the purview of the accompanying claims.

What I claim as my invention is:

1. In a valve, a chamber connected to a part to be lubricated and to a lubricant supply, a piston movable in one direction in said chamber by the pressure of the lubricant for expelling the lubricant in said chamber in front of said piston and for admitting a measured supply of lubricant into the chamber behind said piston from said supply and means for returning said piston to its original position and for simultaneously by-passing the said measured amount of lubricant to the discharge end of said chamber, said by-pass extending circumferentially around the said chamber and communicating therewith upon opposite sides of the piston.

2. In a valve, a chamber connected to a part to be lubricated and to a lubricant supply, a piston movable in one direction in said chamber by the pressure of the lubricant for expelling the lubricant in said chamber in front of said piston and for admitting a measured supply of lubricant into the chamber behind said piston from said supply, means for returning said piston to its original position and for simultaneously by-passing the said measured amount of lubricant to the discharge end of said chamber and means including a separate piston for controlling said by-pass.

3. In a valve, a chamber connected to a part to be lubricated and to a lubricant supply, a piston movable in one direction in said chamber by the pressure of the lubricant for expelling the lubricant in said chamber in front of said piston and for admitting a measured supply of lubricant into the chamber behind said piston from said supply, means for returning said piston to its original position and for simultaneously by-passing the said measured amount of lubricant to the discharge end of said chamber, said means including a second chamber extending circumferentially around the chamber aforesaid and communicating with the latter upon opposite sides of the piston and means separate for controlling said by-pass.

4. In a valve, a chamber connected to a part to be lubricated and to a lubricant supply, an element reciprocably mounted in said chamber for expelling a previously measured quantity of lubricant from said chamber and for permitting a measured quantity to enter said chamber from said lubricant supply and means for transferring said latter measured amount of lubricant to the discharge end of said chamber including a by-pass extending circumferentially around the piston.

5. In a valve, a chamber communicating with a lubricant supply and with a part to be lubricated, means for expelling a quantity of lubricant from said chamber to the part to be lubricated and for permitting a measured quantity to enter said chamber from said lubricant supply and a by-pass extending circumferentially around the piston and communicating with the chamber upon opposite sides of the piston for transferring said measured supply to the discharge end of said chamber.

6. In a valve, a cylinder having an outlet at one end and a lubricant inlet at the opposite end, a plunger movable in said cylinder forming an ejector chamber at one side and a measuring chamber at the opposite side thereof, a by-pass extending circumferentially around said plunger and connecting said chambers, means for automatically controlling said by-pass, said plunger being movable in one direction for expelling the lubricant in the ejector chamber and for admitting lubricant into the measuring chamber and movable in the opposite direction for forcing the measured lubricant through said by-pass from said measuring chamber to said ejector chamber.

7. In a valve, a chamber in said valve, means connecting said chamber to a part to be lubricated and to a lubricant supply, an ejector piston in said chamber, a valve piston in said chamber and a by-pass connecting the chamber on opposite ends of said ejector piston whereby lubricant under pressure will move said pistons to close said by-pass and eject a previously measured quantity of lubricant from said chamber and admit a measured amount into said chamber between said pistons and means for returning said pistons to normal position whereby said by-pass is opened and said measured amount of lubricant transferred into the discharge end of said chamber.

8. In a valve, a chamber in said valve, means connecting said chamber to a part to be lubricated and to a lubricant supply, an ejector piston in said chamber, a valve part operated by said ejector piston for controlling the connection between said valve and the part to be lubricated, a valve piston in said chamber and a by-pass connecting the chamber on opposite ends of said ejector piston whereby lubricant under pressure will move said pistons to close said by-pass and eject a previously measured quantity of lubricant from said chamber and admit a measured amount into said chamber between said pistons and means for returning said pistons to normal position whereby said by-pass is opened and said measured amount of lubricant transferred into the discharge end of said chamber.

9. In a valve, a chamber in said valve, means connecting said chamber to a part to be lubricated and to a lubricant supply, an ejector piston in said chamber, a separate removable valve piston in said chamber and a by-pass connecting the chamber on opposite ends of said ejector piston whereby lubricant under pressure will move said pistons to close said by-pass and eject a previously measured quantity of lubricant from said chamber and admit a measured amount into said chamber between said pistons and means for returning said pistons to normal position whereby said by-pass is opened and said measured amount of lubricant transferred into the discharge end of said chamber, the measured amount of lubricant being dependent upon the size of said removable valve piston.

10. In a measuring valve, a body formed with a chamber connected respectively to the part to be lubricated and to a lubricant supply, an ejector piston in said chamber, a by-pass connecting said chamber on opposite sides of said piston, a valve piston controlling said by-pass, said pistons both having areas subject to the lubricant pressure whereby said pistons are moved to close said by-pass, said ejector piston continuing to expel the previously measured lubricant and to open a measuring chamber between said pistons and spring means for returning said pistons whereupon said by-pass is opened and the measured quantity of lubricant by-passed to the discharge end of said chamber.

11. In a valve, a body formed with a chamber connected to a part to be lubricated and to a lubricant supply, an ejector piston and a valve piston in said chamber, a by-pass around said ejector piston controlled by said valve piston, said pistons both having areas subject to the source of lubricant under pressure whereby, said pistons are moved to close said by-pass, eject a previously measured quantity of lubricant, and admit a measured amount into the chamber between said pistons and means for returning said pistons to normal position whereby said by-pass is opened and said measured quantity of lubricant transferred to the discharge end of said chamber.

12. In a valve, a chamber connected to a part to be lubricated and to a lubricant supply, a by-pass extending around the chamber aforesaid and extending longitudinally thereof, a piston reciprocably mounted in said chamber for expelling a previously measured quantity of lubricant from said chamber and for permitting a measured quantity to enter said chamber from said lubricant supply, means for returning said piston to its original position for passing the said measured amount of lubricant through said by-pass to the discharge end of said chamber, and a member reciprocable in said chamber and engageable with said by-pass for controlling the same.

13. In a valve, a chamber communicating with a lubricant supply and with a part to be lubricated, a piston reciprocably mounted within said chamber for expelling a quantity of lubricant from said chamber to the part to be lubricated and for permitting a measured quantity to enter said chamber from said lubricant supply, and a second chamber spaced from and extending circumferentially around the chamber aforesaid and communicating with the latter upon opposite sides of the piston for transferring the measured quantity of lubricant to the discharge end of said chamber.

WILLIAM S. PRITCHARD.